United States Patent [19]

Masukane et al.

[11] Patent Number: 5,327,156
[45] Date of Patent: Jul. 5, 1994

[54] APPARATUS FOR PROCESSING SIGNALS REPRESENTATIVE OF A COMPUTER GRAPHICS IMAGE AND A REAL IMAGE INCLUDING STORING PROCESSED SIGNALS BACK INTO INTERNAL MEMORY

[75] Inventors: Kazuyuki Masukane, Garden City, N.Y.; Kenneth E. Bartsch, Lititz, Pa.

[73] Assignee: Fuji Photo Film Co., Ltd., Kanagawa, Japan

[21] Appl. No.: 3,828

[22] Filed: Jan. 8, 1993

Related U.S. Application Data

[63] Continuation of Ser. No. 611,201, Nov. 9, 1990, abandoned.

[51] Int. Cl.⁵ .................. G09G 1/16; H04N 5/272
[52] U.S. Cl. .................................... 345/113; 345/3; 345/189; 348/584
[58] Field of Search ............. 340/790, 799, 703, 750, 340/800, 814; 358/140, 72, 148, 183, 11, 12; 345/1, 3, 113, 114, 132, 118, 189, 202

[56] References Cited

U.S. PATENT DOCUMENTS

| | | | |
|---|---|---|---|
| 4,084,261 | 4/1978 | Laker et al. | 340/799 |
| 4,357,624 | 11/1982 | Greenberg | 358/22 |
| 4,408,197 | 10/1983 | Komatsu et al. | 340/723 |
| 4,595,996 | 6/1986 | Morley et al. | 340/799 |
| 4,599,611 | 7/1986 | Bowker et al. | 340/721 |
| 4,608,596 | 8/1986 | Williams et al. | 340/703 |
| 4,639,721 | 1/1987 | Eto et al. | 340/750 |
| 4,682,297 | 7/1987 | Iwami | 358/183 |
| 4,698,674 | 10/1987 | Bloom | 358/140 |
| 4,729,028 | 3/1988 | Micic et al. | 358/22 |
| 4,771,279 | 9/1988 | Hannah | 340/800 |
| 4,791,489 | 12/1988 | Polatnick | 358/22 |
| 4,823,120 | 4/1989 | Thompson et al. | 340/703 |
| 4,907,086 | 3/1990 | Truong. | |
| 4,918,526 | 4/1990 | Lewis et al. . | |
| 4,933,773 | 6/1990 | Shiota et al. . | |
| 4,947,256 | 8/1990 | Wood et al. | 358/22 |
| 4,964,069 | 10/1990 | Ely | 358/148 |
| 4,994,912 | 2/1991 | Lumelsky et al. | 340/814 |
| 5,109,348 | 4/1992 | Pfeiffer et al. | 340/799 |

OTHER PUBLICATIONS

Matrox, "VGO-AT EGA Video/Graphics Overlay for the PC AT".
U.S. Video Brochure.
Redlake Corporation Brochure, "Spectrum NTSC Video Graphics Overlay and Frame Grabber Board".

*Primary Examiner*—Alvin E. Oberley
*Assistant Examiner*—Steven J. Saras
*Attorney, Agent, or Firm*—Sughrue, Mion, Zinn, Macpeak & Seas

[57] ABSTRACT

A video data processing apparatus converts one of NTSC type and VGA type video signals to the other or overlays the two types of video signals and outputs them as either an NTSC type overlaid video signal or a VGA type overlaid video signal. The processing apparatus has two video memories for storing video signal data. One of the two video memories stores solely VGA type video data. The other video memory stores either VGA type video data or NTSC type video data depending upon the particular function being carried out by the processing apparatus. Video data may be read out from the other video memory using different scan rates so that an individually dedicated memory is not required for each type of video data in performing the above-mentioned conversions and overlays. An output of the video processing apparatus may be fed back to either one of the two video memories so that the output may be stored in one of the memories for later transfer to an external memory.

21 Claims, 9 Drawing Sheets

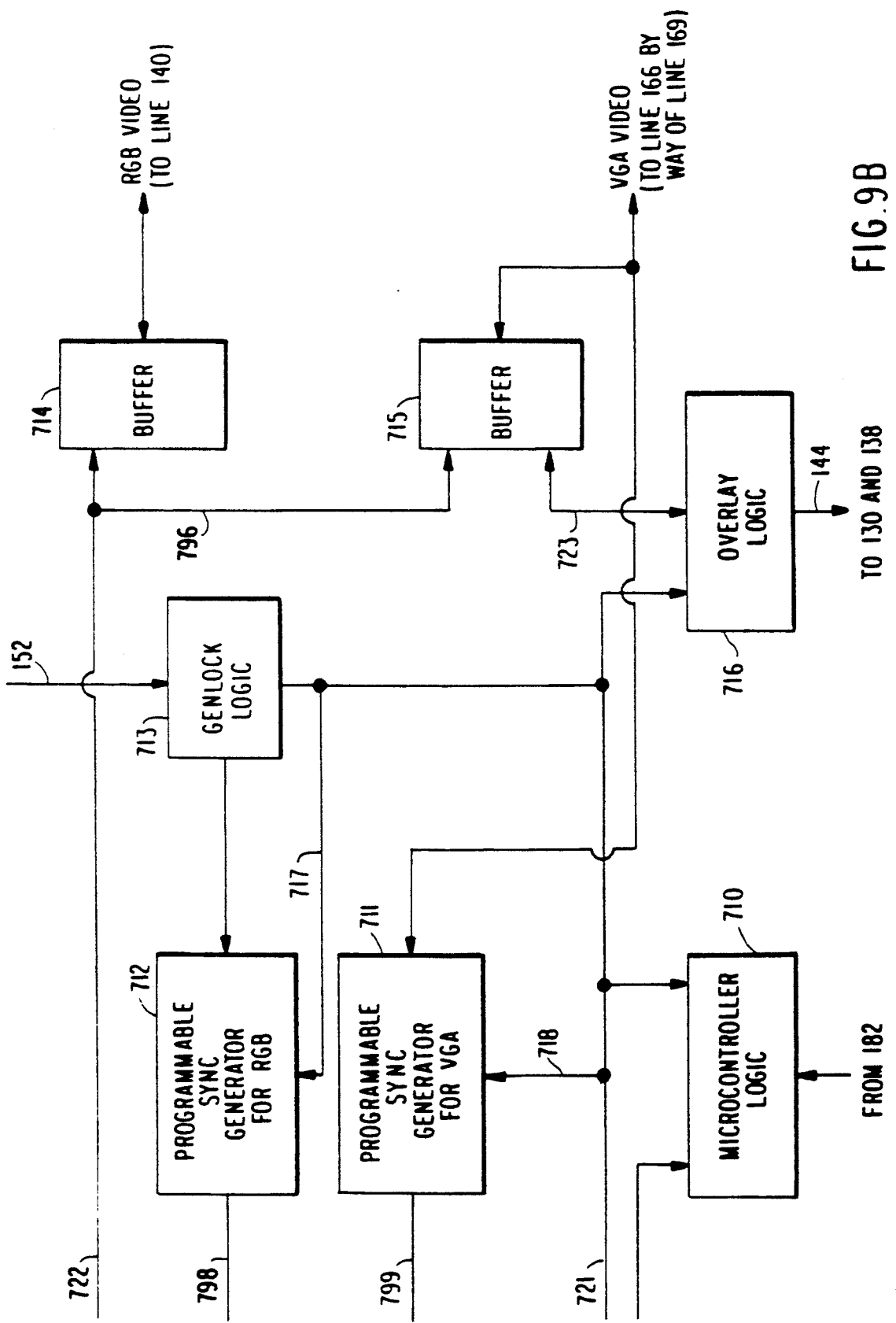

APPARATUS FOR PROCESSING SIGNALS REPRESENTATIVE OF A COMPUTER GRAPHICS IMAGE AND A REAL IMAGE INCLUDING STORING PROCESSED SIGNALS BACK INTO INTERNAL MEMORY

This is a continuation of application Ser. No. 07/611,201 filed Nov. 9, 1990 now abandoned.

FIELD OF THE INVENTION

The present invention relates to an apparatus for mixing image signals and, more particularly, to an apparatus for mixing a signal representative of a graphics image generated by a computer and a video signal, such as an NTSC signal or the like, representative of a real image. The invention also relates to an apparatus for converting a signal representative of a graphics image into a video signal representative of a real image and vice versa.

BACKGROUND OF THE INVENTION

Imaging systems available today include one in which, for example, a television (TV) signal generated by a TV camera or a video signal recorded on a video floppy disc by an electronic still camera is inputted to a computer system to be displayed on a monitor in a particular form such as, for example, a Video Graphics Array (VGA) form. This prior art imaging system as shown in FIG. 7 includes a personal computer 10 and an image recording and reproducing device 12 which are interfaced to each other by an electronics board 97. When the recording and reproducing device 12 is loaded with a video floppy disc 18 to read a video signal representative of a real image, the video signal is transformed into corresponding digital data by an analog-to-digital converter 98 of electronics board 97 and then developed as bit-mapped data in a dedicated video frame memory 99 also included in the electronics board. The personal computer 10 may then fetch the bit-mapped data later as needed and, thereafter, handle the data as a VGA image including displaying the data on VGA monitor 16.

Also, graphics in a VGA format generated by a personal computer may be converted to video signals capable of being recorded on a video floppy disc by an electronic still camera using conventional techniques as shown in FIG. 6. In FIG. 6 PC graphics are stored in a dedicated Buffer 1 and are read out by scan converter 2 along line 3 using a read-out rate dependent on the particular type of video signal format desired. In the figure an NTSC video signal capable of being recorded on a video floppy disc is shown as an output of scan converter 2. However, different scan rates, for example, PAL or SECAM scan rates, may also be used. The resultant NTSC signal in the figure may then be displayed on NTSC monitor 24.

As shown in FIGS. 6 and 7, it is known to provide a conversion from VGA to NTSC and vice versa. However, using the circuits of FIGS. 6 and 7, separate and independent hardware is required to store the video signal in its present state before it is converted. For example, in FIG. 6 a dedicated PC Graphics Buffer 1 must be provided to store the VGA signal before it is converted to NTSC by scan converter 2 since the VGA data must be arranged in a predetermined way so that the fixed rate scan converter 2 may properly access it in order to transform the signal to NTSC. Likewise, in FIG. 7 a dedicated frame memory 99 must be provided to store an NTSC signal before it is converted to VGA by the fixed-rate read-out operation of personal computer 10. Therefore, a large amount of hardware is needed in order to convert NTSC video signals to VGA and vice versa.

It is also known to insert (overlay) a computer graphics (VGA) signal in selected locations of an NTSC image and to display the thus-combined video signal onto an NTSC monitor such as a conventional TV receiver. Such a conventional system is shown in FIG. 8. An interlaced NTSC video signal is input to input terminal 202 and supplied to video combiner 203. A synchronization component of the input NTSC video signal is supplied to Gen-lock circuitry 201 which provides an output to video format converter 200. Non-interlaced VGA signals are pre-stored in PC graphics memory 100 and are supplied to scan-rate converter 200 which modifies the scan rate of the input non-interlaced VGA signals based on the output of the Gen-lock circuitry 201. The Gen-lock circuitry 201 receives the synchronization component of an input video signal, in this case NTSC, and provides an output to video format converter 200 so that the converter 200 can modify the format of its input, in this case VGA from PC graphics memory 100, so that the output of the converter 200 has a format equal to the input signal to the Gen-lock circuitry 201.

In FIG. 8 the converter 200 modifies the non-interlaced VGA input into interlaced VGA in the NTSC format and supplies the interlaced VGA to video combiner 203. At this point the VGA signal is of the same format (i.e., interlaced) as the NTSC video signal which is also supplied to video combiner 203. The output 204 of combiner 203 is an interlaced VGA signal overlaid onto an NTSC signal.

It is also known to overlay NTSC video signals onto VGA signals and to display the result onto a VGA monitor using prior art systems. However, a dedicated VGA Buffer and a dedicated NTSC video memory are required in the prior art systems.

As is clear from the description of the prior art systems above, a separate and dedicated frame memory or Buffer is required to hold each type of image signal, since a different type of image signal has a different format (i.e., interlaced or non-interlaced). For example, in FIG. 7 a separate dedicated frame memory 99 is required to store the NTSC signal before it is converted to VGA. Further, a separate and dedicated PC Graphics buffer (1,100) is required in FIGS. 6 and 8, respectively, in order to store VGA signals.

Since dedicated buffers or memories have been required by the prior art, a large amount of hardware is necessary in order to provide image signal processing equipment capable of handling a variety of image signal formats.

A video signal processing apparatus has been described in co-pending application Ser. No. 08/003,829 and involves a system for converting one of NTSC type and VGA type video signals to the other or overlays the two types of video signals and outputs them as either an NTSC type overlaid video signal or a VGA type overlaid video signal. The processing system has two video memories for storing video data. One of the two video memories stores solely VGA type video data. The other video memory stores either VGA type video data or NTSC type video data depending upon the particular function being carried out by the processing system. Video data may be read out from the other video memory using different scan rates so that an individually dedicated memory is not required for each type of video data in performing the above-mentioned conversions and overlays.

In the above-mentioned system, video output signals representing a mixture of a computer graphics (VGA) image and an NTSC-type image are easily displayed on a selected one of a computer graphics (VGA) type monitor or an NTSC-type monitor. However, the combined (overlaid) video image signals are not so easily sent on to an external memory. Difficulties arise in attempting to store an overlaid video signal in an external memory because the speed of the overlaid signal as it comes out of the above-mentioned video processing system is too fast for an external memory to handle. For example, the overlaid signals are sent out at a rate in the Megahertz (Mz) region. It would be useful to be able to store overlaid images in an external memory as an alternative to merely displaying the overlaid image onto a monitor display. By storing overlaid images in an external memory they would be able to be easily and selectably read out and displaced on a monitor at a later time without having to re-overlay the image signals making up the composite overlaid signal. Also, further processing or overlaying of the overlaid signals would be simplified.

SUMMARY OF THE INVENTION

An object of the present invention is to provide image signal processing equipment capable of handling a variety of image signal formats.

It is a further object of the invention to provide an image signal processing system capable of handling a variety of image signal formats and using a minimum amount of hardware so as to reduce costs of the overall system.

The above objects have been attained by the inventors by providing an improved image overlay and rescan board capable of receiving image signals of a variety of formats including NTSC image signals representative of a real image and VGA image signals representative of a computer generated graphics image. The overlay and rescan board includes a timing gate-array for addressing a frame memory and for sending and receiving data to and from the frame memory.

Both image signals representative of a real image and image signals representative of a computer generated graphics image are capable of being selectively received by and sent to the timing gate-array depending on the particular type of operation to be performed by the overlay and rescan board. Possible operations of the board include conversion from computer graphics image signals to image signals representative of real images (such as NTSC video) and vice versa, and overlaying of computer graphics image signals onto image signals representative of real images and vice versa.

Depending on the particular operation to be carried out by the overlay and rescan board, the timing gate-array either reads from or writes to the frame memory at a read/write rate dependent on the type of image signal to be read from or written to the frame memory.

In this way, a single frame memory is capable of temporarily storing an image signal of either a computer graphics type or a real image type. Thus, an overlay and rescan board capable of performing a variety of image processing operations having a minimum amount of hardware is achieved.

A still further object of the invention is to provide a video image processing system in which overlaid image signals, obtained by overlaying VGA-type image signals onto NTSC-type video signals or vice versa, may be easily stored to an external memory.

The last-mentioned object has been attained by placing a feedback connection from an output of a video image switcher, used to combine two signals making up the composite overlaid signal, back to an input of a control means used to control the write in/read out rate of an internal frame memory. The overlaid image, once formed, is fed back to the control means and stored into the internal frame memory. Once the overlaid image has been stored in the internal frame memory it may easily be read out and stored into an external memory at a transfer rate which the external memory can handle, i.e., a transfer rate substantially less than the Megahertz (Mz) range rate at which the overlaid images are provided.

BRIEF DESCRIPTION OF THE DRAWINGS

The objects and features of the present invention will become more apparent from the consideration of the following detailed description taken in conjunction with the accompanying drawings in which:

FIGS. 9A and 9B show a timing gate-array of the present invention;

DETAILED DESCRIPTION OF THE PREFERRED EMBODIMENT

Figure 1:
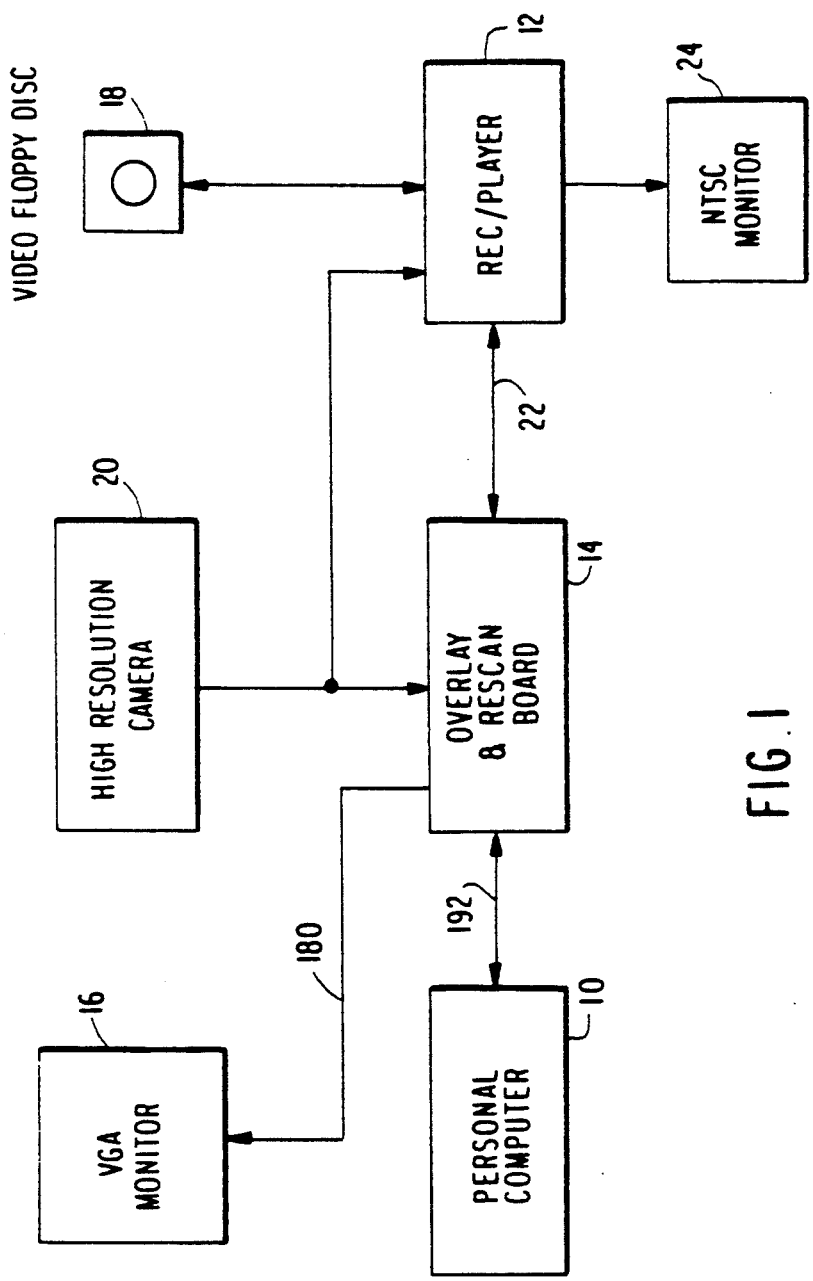
FIG. 1 is a block diagram schematically showing a preferred embodiment of the video signal mixing apparatus in accordance with the present invention.

Referring to FIG. 1 of the drawings, a video or image signal mixing apparatus embodying the present invention is shown and has a personal computer 10 and a rec/player 12 which are interconnected by an overlay and rescan board 14. The personal computer 10 is a commercially available 16-bit or 32-bit processor system and includes program sequences for handling graphics and text. Advantageously, the personal computer 10 may be implemented with a processing system corresponding to IBM PC/XT/AT to SP/2 M-30, for example. Graphics data are dealt with as raster data, vector data, or bit-mapped data. A VGA monitor 16 is connected to the computer 10 and, in the illustrative embodiment, visibly displays VGA video data rendered in a pseudo-color mode. A VGA image has a standardized screen size and is non-interlaced, as is well known in the art. In general, VGA image data are represented in a pseudo-color mode where one pixel of image data is represented by one numerical value, as is also known in the art. When a look-up table is referenced with the numerical value being used as an address, a group of three color components associated with the numerical value is produced. This group of color components determines the color and luminance of the pixel of interest.

The rec/player 12 is a recording and reproducing unit for writing a true-color mode analog video signal to a video floppy 18 and reading it out of the video floppy 18. A video signal source such as a high resolution camera 20 is also connected to the rec/player 12. The rec/player 12 may be of the type having a function of recording and reproducing a video signal to and from a video tape, not shown, in place of or in addition to the video floppy 18. Generally, a TV signal or similar signal representative of a real image produces colors and luminance in a true-color mode where one pixel is represented by three numbers representing the weights of three color components, red, green, and blue, so that the reproduced image is impressive to some degree.

Figure 2:
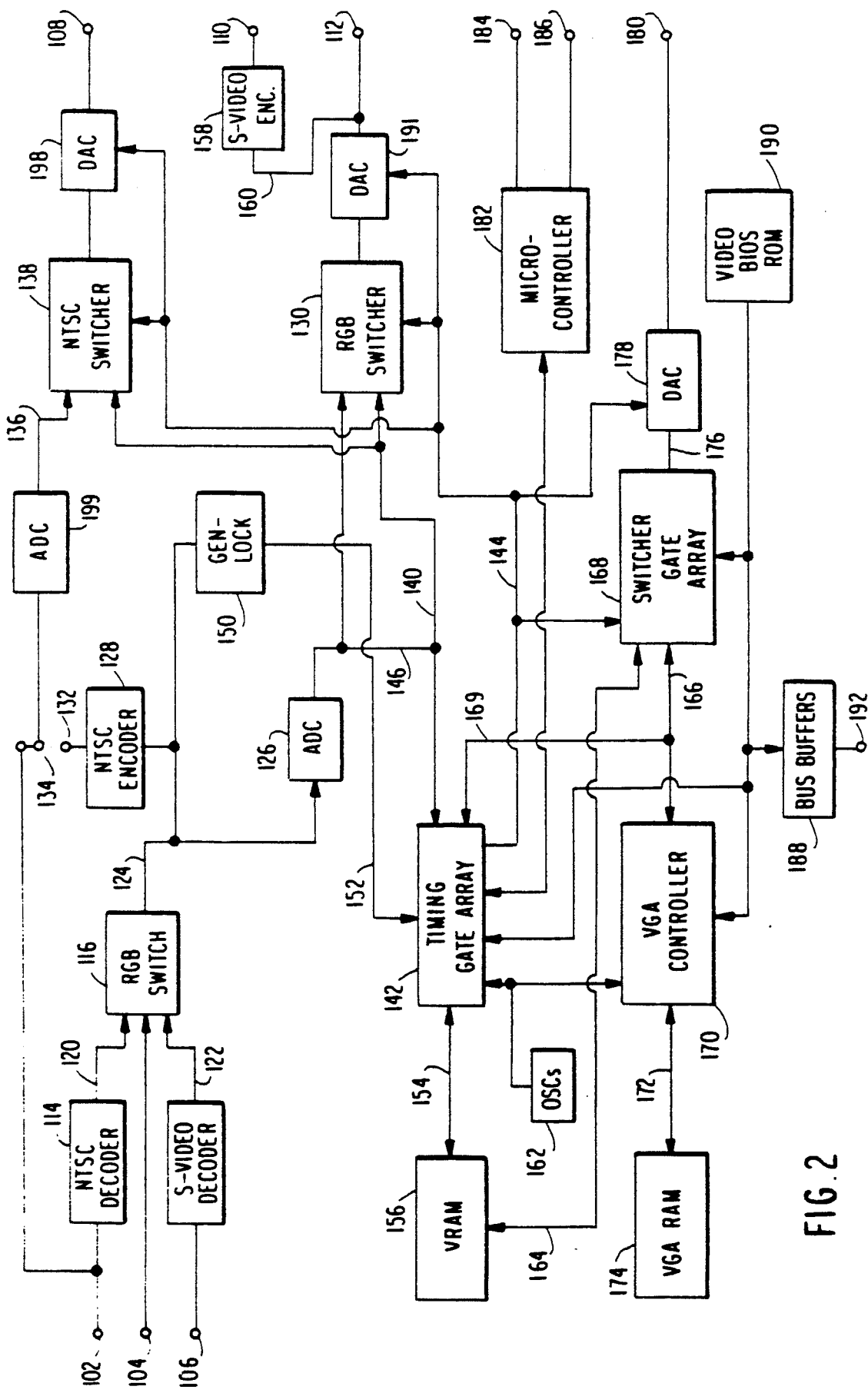
FIG. 2 is a schematic block diagram showing a specific construction of an overlay and rescan board included in the illustrative embodiment.

An overlay and rescan board 14 connects the personal computer 10 and rec/player 12 to each other. In the illustrative embodiment, the board 14 has a signal converting and mixing function, i.e., it is capable of receiving NTSC, RGB and S-type video signals, as well as VGA video signals and outputting them as any one of NTSC, RGB, S-type and VGA video signals as needed. FIG. 2 shows a specific construction of the overlay and rescan board. It should be kept in mind that the present invention is advantageously practicable not only with the above-mentioned types of video signals but also with other types of video signals such as PAL and SECAM.

The overlay and rescan board 14 has input ports 102, 104 and 106 for receiving video signals representative of real images, and output ports 108, 110 and 112 for outputting video signals representative of real images. The input ports 102, 104 and 106 are individually connected to any desired video signal sources such as the high resolution camera 20, a player for playing the video floppy 18 or a video tape, an image scanner, or a communication line, not shown. The output ports 108, 110 and 112 constitute a part of the connection line of the board 14 to the rec/player 12 and are connected to the drive of the video floppy 18 or a video tape, not shown, and/or a video monitor 24, and other similar picture output units.

The input port 102 receives an NTSC signal and is connected to the input of an NTSC decoder 114 which transforms an NTSC video input on the input 102 into an RGB video signal and feeds the RGB video signal to an input 120 of an RGB switch 116. The input port 104 receives an RGB signal and feeds it directly to the RGB switch 116, while the input port 106 receives an s-type video signal and applies it to the input of an S-video decoder 118. The S-video decoder 118 transforms the video input on the input 106 into an RGB video signal and delivers the resulting signal to another input 122 of the RGB switch 116. It will be seen that in the illustrative embodiment the overlay and rescan board 14 handles video signals basically as RGB signals.

The RGB switch 116 plays the role of a selector circuit for selectively connecting the three inputs 120, 104 and 122 to an output 124 thereof one at a time. The output 124 of the RGB switch 116 is connected to the inputs of an analog-to-digital converter (ADC) 126, an NTSC encoder 128, and a Gen-lock circuit 150. The NTSC encoder 128 converts the RGB signal on the input 124 into an NTSC signal and then feeds it out via an output 132 thereof. The output 132 is connected to a selector circuit 134. Also connected to the selector circuit 134 is the direct NTSC input 102. The selector circuit 134 selectively connects either one of the two NTSC inputs 102 and 132 to an A/D converter 199 which has an output 136 thereof which is connected to one input of an NTSC switcher 138. The NTSC switcher 138 has two inputs 136 and 140 and an output connecting to the video output 108 through a digital-to-analog converter 198. The NTSC switcher 138 selectively connects either one of the two inputs 136 and 140 to the output 108 in response to a control output 144 which is fed thereto from a timing gate-array 142, as will be described specifically later. This switching operation of the switcher 138 can be implemented with the pixel clock rate.

The ADC 126 has a reference generator, not shown, for setting a full scale range and converts an analog RGB signal appearing on the input 124 into corresponding digital data, the digital data being fed out via an output 146. The output 146 is connected to the timing gate-array 142. The output 124 of the RGB switch 116 is connected to a Gen-lock circuit 150 also. The Gen-lock circuit 150 locks its output signal phase to the video frequency of the input 124 and generates a high-speed clock meant for the other logic circuitry on an output 152 thereof. The output 152 is connected to the timing gate-array 142.

The timing gate-array 142 is a programmable video timing generator, which generates video synchronization signals for virtually any type of video in response to reference clocks generated by reference oscillators 162. As an example, two popular video standards are NTSC and VGA. Both of the two video standards have different characteristics. Conventionally, equipment which is designed for one standard could not be used with the other. As a result, it is useful for a video product to provide both types of outputs. Historically, such products utilize one frame memory to generate NTSC, and another frame Buffer to generate VGA. The present invention relies on the fact that many applications need not generate both simultaneously, and by using a programmable frame memory only one frame memory is required.

In the illustrative embodiment, the timing gate-array 142 is so constructed by hardware as to be capable of selectively writing either one of NTSC type video signals and VGA video signals to a video RAM (VRAM) 156 and reading out the signals stored therein. The VRAM 156 and timing gate-array 142, therefore, constitute a programmable frame memory, and this memory implements scan conversion. Specifically, with the programmable frame memory it is possible to transform VGA type video signals into NTSC type video signals and vice versa.

The timing gate-array 142 has a data input/out port 154 which is connected to the VRAM 156. The VRAM 156 is a RAM capable of storing video data having various video formats and, in the illustrative embodiment, has a capacity great enough to accommodate one frame of video data, i.e., 1 Mbyte. The timing gate-array 142 and VRAM 156 together form a programmable video image generator.

The details of the timing gate-array 142 are clearly shown in FIG. 9 which will be explained now.

Gen-lock logic block 713 receives video synchronization information derived from the signal output from RGB switch 116 by way of the Gen-lock circuit 150 along line 152. The video synchronization information could pertain to either RGB, NTSC or S-type video depending on the particular signal output from the RGB switch 116. The video synchronization information is next sent through a programmable sync generator 712, which will be described below, and on to a VRAM address Buffer/Multiplexer 703 which will also be described below.

The Gen-lock logic block 713 of the timing gate-array 142 is constantly monitoring the Gen-lock circuit 150 to see if the Gen-lock circuit is outputting synchronization information. When the Gen-lock logic 713 senses that Gen-lock circuit 150 is not outputting video synchronization information, Gen-lock logic 713 sends a signal to the programmable sync generator 712 to initiate a free running mode in the programmable sync generator 712. In this free running mode the programmable sync generator generates internal synchronization information based on information sent to the programmable sync generator 712 by the personal computer 10 along the CPU bus 192 and along line 717. The information sent along line 717 from the personal computer 10 may include information relating to a variety of video synchronization formats, such as NTSC, PAL, S-type, or RGB, for example. The free running mode is used for situations when no external signal is sent through the RGB switch 116 to the Gen-lock circuit 150 shown in FIG. 2. Such a situation, for example, would occur during a conversion from VGA type information to NTSC type information, as will be described below.

A second programmable sync generator 711 is used for generating synchronization information relating to VGA signals. The programmable sync generator 711 receives inputs from the VGA controller 170 shown in FIG. 2 and from the CPU bus 192 for providing the sync generator 711 with the proper information it needs to produce synchronization information relating to the VGA format. The connection from the CPU bus 192 to the sync generator 711 through line 718 provides for the programming of the sync generator 711 during a free running mode, such as the one described above with respect to the programmable sync generator 712. During a non-free running mode the programmable sync generator 711 receives external synchronization information along line 166 from the VGA controller 170. During the free running mode, when a VGA signal is not applied to line 166, the sync generator 711 produces internal synchronization information based on information sent to the sync generator 711 along CPU bus 192 and along line 718. The information sent along line 718 may relate not only to VGA type information, but also to new types of PC graphic signals which may evolve. Therefore, the programmable sync generators 711 and 712 are fully programmable so that any type of video signal synchronization format may be created.

Synchronization information from the programmable sync generators 711 and 712 is applied to the VRAM address Buffer/Multiplexer 703 as separate inputs. The VRAM address Buffer/Multiplexer 703 receives a plurality of inputs and selects one of the inputs so as to provide an output along line 154 to VRAM 156. The output of Buffer/Multiplexer 703 is sent to the VRAM 156 to provide read and write signals at a time dependent upon the timing of the selected synchronization signal input to the Buffer/Multiplexer 703.

The Buffer/Multiplexer 703 also receives an input from a CPU counter 705. The CPU counter 705 receives an input from the CPU bus 192 so that information from the personal computer 10 may be sent to the CPU counter 705 to specify an exact location, on a pixel by pixel basis, of information stored in or to be stored in the VRAM 156. The CPU counter 705, therefore, allows the personal computer 10 to randomly access the VRAM 156.

The Buffer/Multiplexer 703 is controlled by a VRAM state machine 704 along line 719. The state machine 704 receives inputs from the programmable sync generators 712 and 711 along lines 706 and 720, respectively. The state machine 704 receives another input along line 721 from the CPU bus 192. By receiving these three inputs the VRAM state machine 704 is capable of monitoring the activity of the timing gate-array to decide which of the Buffer/Multiplexer 703 inputs are to be applied to the output 154. The VRAM state machine 704 also receives an input from clock Buffers 707 connected to clock oscillators 162 as shown in FIG. 2. These clock oscillators provide the VRAM state machine with basic timing signals for operating a selection process for selecting the particular input to the multiplexer 703 which is to be applied to output 154.

Figure 9A:
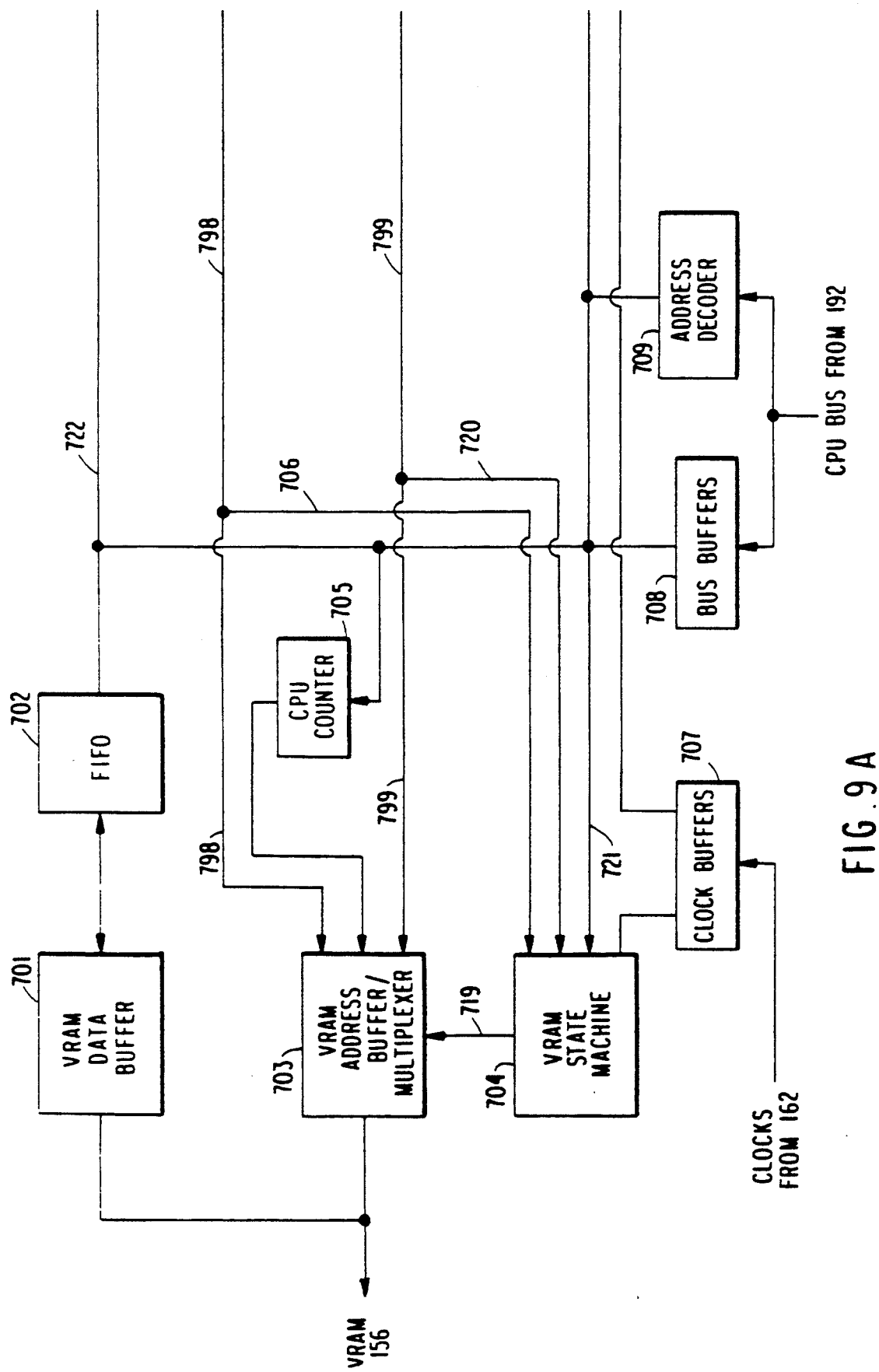

Video data output from RGB switch 116 via ADC 126 is input to the timing gate-array 142 and sent along line 140 to Buffer 714 shown in FIG. 9. The data is sent from Buffer 714 to FIFO shift register 702 along line 722 when data is being written from the RGB switch 116 to the VRAM 156 through the timing gate-array 142. The data is next sent to VRAM data Buffer 701 where the data is held until write commands from the VRAM address Buffer/Multiplexer 703 control the timing of the write operation of the VRAM to write therein data held in the Buffer 701. Information being read from the VRAM 156 is also sent through Buffer 701 and FIFO 702 along line 722 and into Buffer 714 where it is output onto line 140.

VGA data from VRAM controller 170 is input, for control purposes as will be described below, to the timing gate-array 142 into the Buffer 715. The VGA data is also sent to the programmable sync generator 711 for Gen-locking purposes, i.e., to inform the generator 711 whether to use a sync signal supplied by the computer 10 along line 166 or to use an internal sync supplied along line 718. The VGA format stored in Buffer 715 is applied to overlay logic block 716 which receives an additional input from the CPU bus 192. The overlay logic block 716 contains an overlay color register for storing a keying color digital representation; such a keying color being, for example, the color transparent, and an actual data register for storing actual data input to the overlay logic block along line 723 from Buffer 715. The overlay logic block further includes a comparator for comparing the contents of the actual data register and the overlay color register for pixel by pixel color keying according to well know overlay techniques. That is, for example, if the keying color is detected in the VGA data sent to the overlay logic block 716 or line 723, then a command signal is sent, one line 144, to the switcher gate-array 168, which will be described later, so as to command the switcher gate-array 168 to switch (key) from taking its output from the VGA RAM 174 to a situation where 168 takes it output from VRAM 156.

FIG. 9 also shows microcontroller logic block 710 which receives inputs from the clock Buffers 707 and the CPU bus 192. This microcontroller logic block is used for controlling external video disk players, or the like, along line 182 and does not form a major part of this invention.

The timing gate-array line 140 is connected to inputs of the NTSC switcher 138 and the RGB switch 130. The RGB switch 130 serves as a selector circuit for selectively outputting either one of the two inputs 124 and 140 in response to the control output 144 of the timing gate-array 142. The output of the switch 130 is connected to an input 160 of an S-video encoder 158 and the RGB format output port 112 through a digital-to-analog converter 191. The S-video encoder 158 transforms the RGB signal into an S-type video signal and outputs the latter on an output 110 thereof.

The VRAM 156 has an additional data input/output port 164 which is connected to one input of a switcher gate-array 168. The other input/output port 166 of the switcher gate-array 168 is connected to the timing gate-array 142 and a VGA controller 170. The VGA controller 170 converts software commands into bit-mapped pixel images as is well-known in the art. The VGA controller 170 has an input/output port 172 to which a VGA RAM 174 is connected. The VGA RAM 174 stores video information having various formats generated by the personal computer 10 as is well known in the art. While the video information may be of any one of the raster type, vector type, and bit-mapped type, it is transformed into raster data before being written to the VGA RAM 174. Of course, the video information may include text data. In the illustrative embodiment, the VGA RAM 174 has a capacity of 1 Mbyte.

Figure 10:
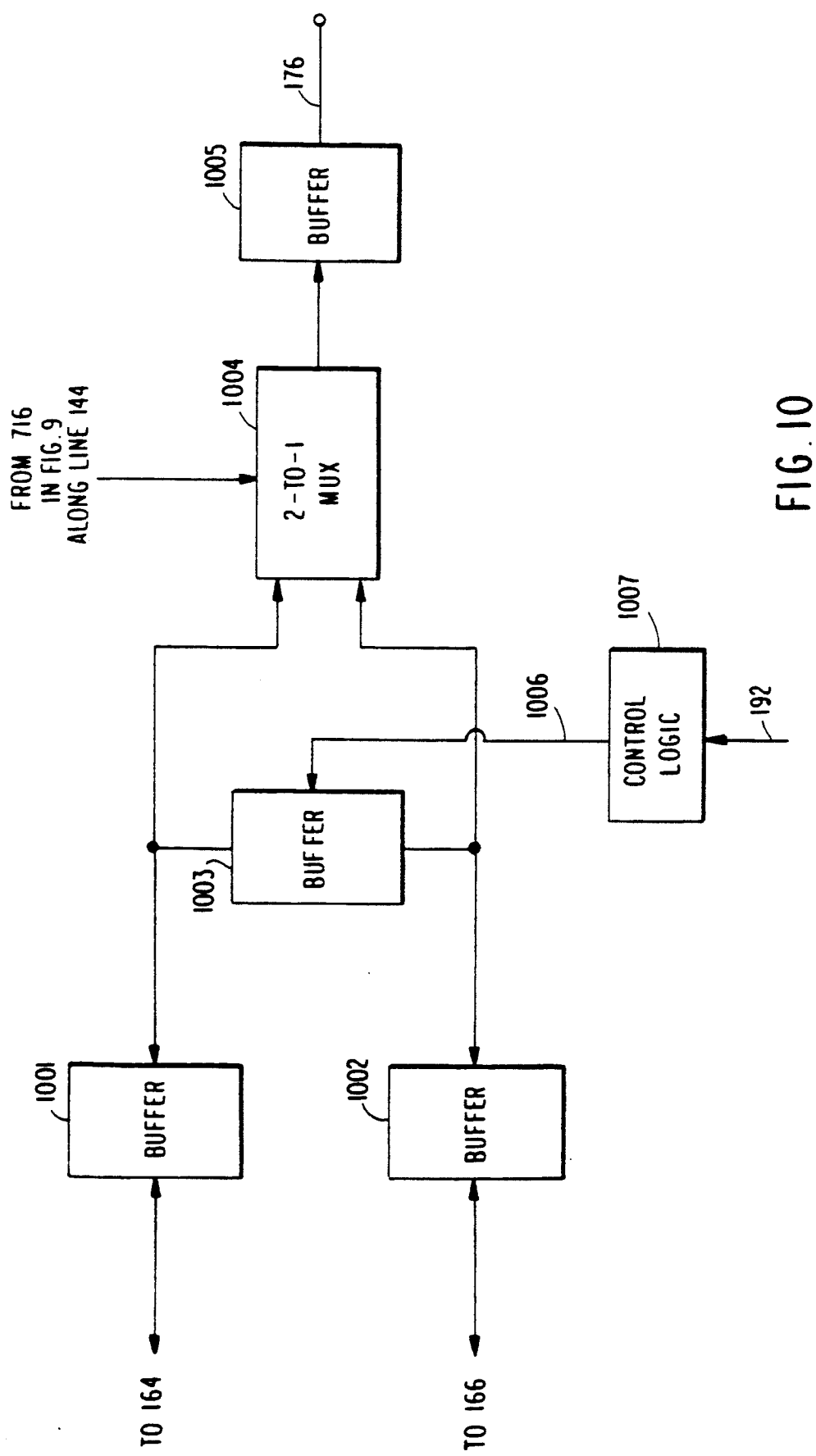
FIG. 10 shows a switcher gate-array of the present invention.

The switcher gate-array 168 as shown in detail in FIG. 10 is a selector circuit which delivers a video signal read from the VRAM 156 and appearing on the output line 164 to an output 176 thereof through Buffer 1001, MUX 1004 and Buffer 1005, or selectively applies a VGA video output fed thereto from the VGA RAM 174 via line 172, VGA controller 170, and line 166 to either one of output 176 through Buffer 1002, MUX 1004 and Buffer 1005 and output 164 through Buffer 1002, Buffer 1003 and Buffer 1001 to the VRAM 156, as instructed by the control output 144 of the timing gate-array 142. The output 176 of the switcher gate-array 168 is connected to a video DAC 178 which, like the video DAC 198, converts digital video data into a corresponding analog VGA signal and delivers the latter to an output 180. The output 180 is connected to the VGA monitor 16 shown in FIG. 1.

The two-to-one multiplexer (MUX) 1004 in FIG. 10 of the switcher gate-array receives a control signal from the overlay logic block 716 along line 144 so as to decide, on a pixel by pixel basis, whether data stored in VRAM 156 or data stored in VGA RAM 174 is to be selected as a MUX output. Control logic block 1007 receives control signals from the CPU bus 192 for use in controlling whether or not the loop-back path created through Buffer 1003 is operable based on desired data flow paths.

Figure 10A:
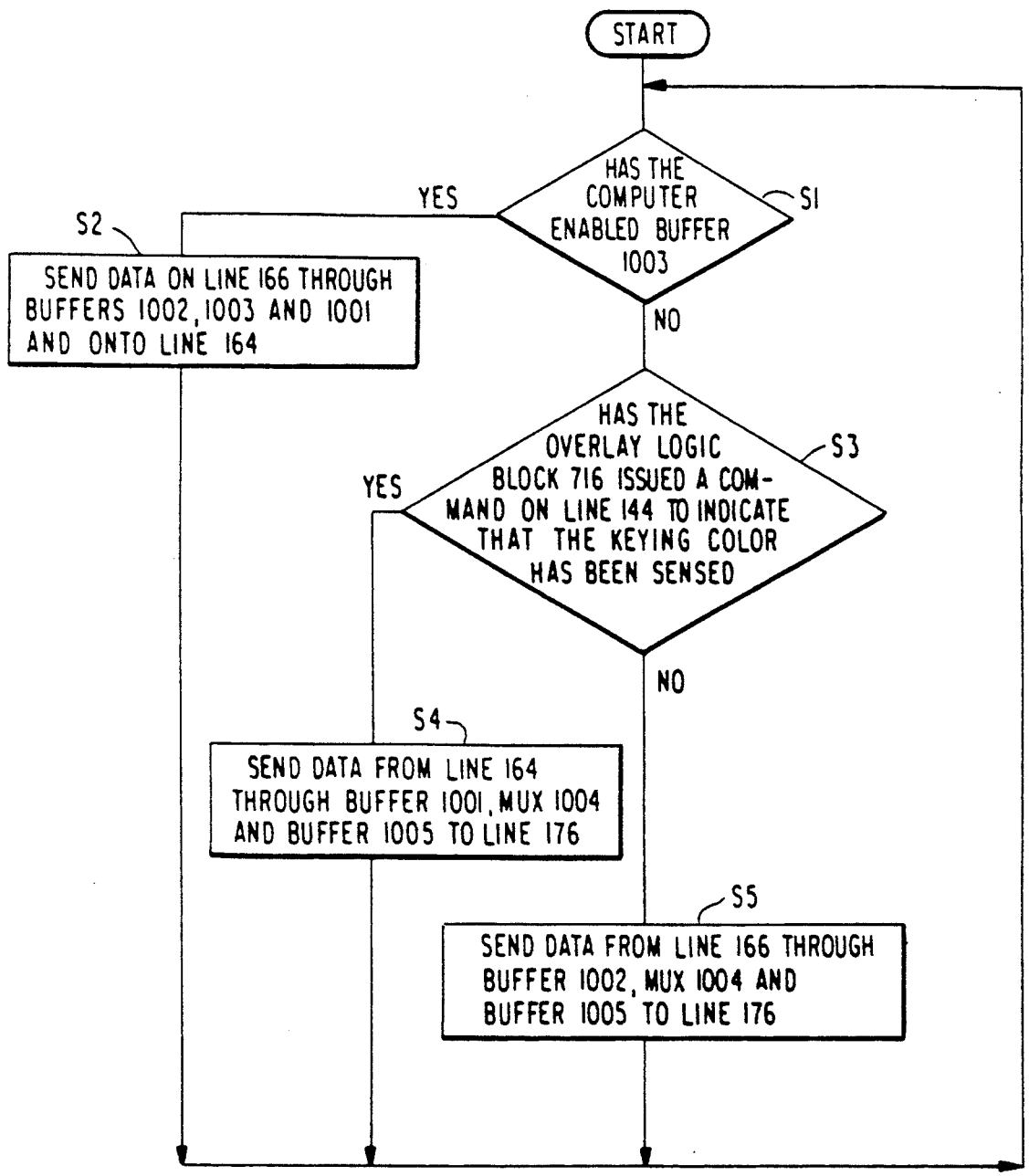
FIG. 10A shows a flow chart for explaining the operation of the switcher gate-array of the present invention.

FIG. 10A shows a flow chart for describing the operation of the switcher gate-array 168. First of all, if the computer 10 has sent a control signal to control logic block 1007 so as to enable Buffer 1003 along line 1006, (Step S1), data appearing on line 166, which comes from the VGA controller 170 and VGA RAM 174, is sent through Buffer 1002, Buffer 1003 and Buffer 1001 onto line 164 (Step S2).

If the decision in Step S1 was NO, i.e., if the computer 10 has not enabled Buffer 1003, then if the overlay logic block 716 of FIG. 9 has issued a command on line 144 to indicate that the keying color, for example, transparent, has been sent to 716 from Buffer 715 (Step S3), then Step S4 is executed. If Step S4 is reached, this means that the predetermined keying color is included in the VGA data coming into the timing gate-array 142 along line 166 through Buffer 715 and on to overlay logic block 716 on line 723 of FIG. 9. The presence of this keying color in the VGA data acts as a signal to stop the switcher gate-array 168 from outputting data from the VGA RAM 174 and to output a pixel of data from the VRAM 156 instead. Therefore, an overlaying effect is created.

Specifically, if at Step S3 the answer is YES then this means that overlay logic block 716 has determined that the keying color has been detected in the VGA data stream and Step S4 is executed, wherein data from line 164 (from VRAM 156) is sent through Buffer 1001, two-to-one MUX 1004 and Buffer 1005 and onto switcher gate-array 168 output line 176. And, if at Step S3 the answer is NO, then this means that overlay logic block 716 has determined that the keying color has not been detected in the VGA data stream and step S5 is executed, wherein data from line 166 (from VGA RAM 174) is sent through Buffer 1002, two-to-one MUX 1004 and Buffer 1005 and on to switcher gate-array 168 output line 176. Therefore, FIG. 10A in conjunction with FIGS. 9 and 10, describes the switcher gate-array 168 operation and the role of the switcher gate-array 168 in the overlaying of NTSC-type video data onto VGA-type image data.

Figure 5:
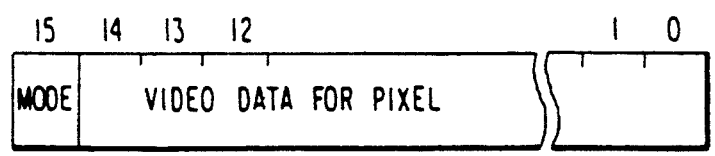
FIG. 5 shows a specific format of video data applicable to the illustrative embodiment.
Figure 6:
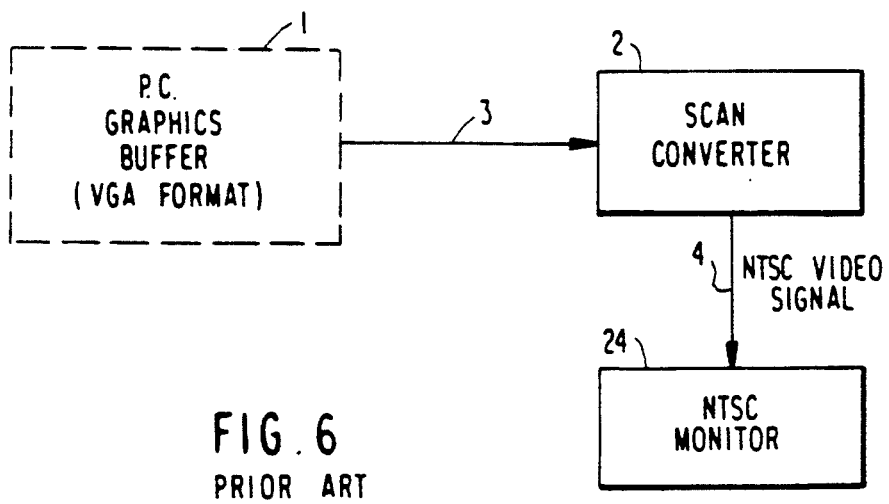
FIG. 6 shows a conventional system for converting VGA signals to NTSC image signals.
Figure 7:
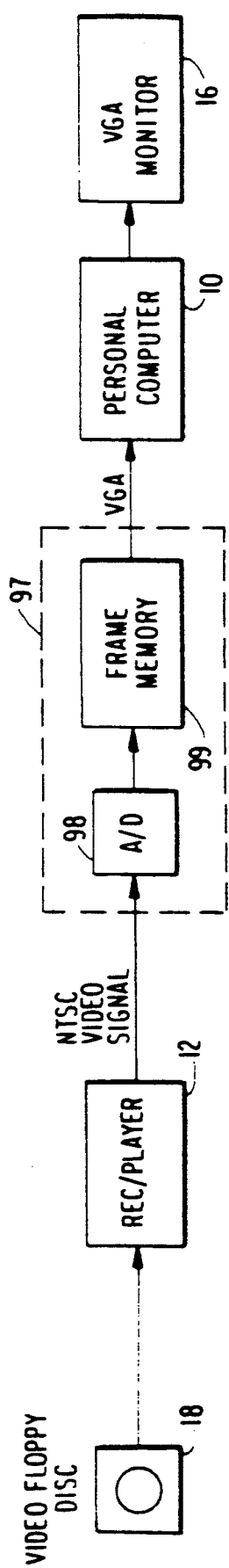
FIG. 7 shows a conventional system for converting NTSC to VGA image signals.
Figure 8:
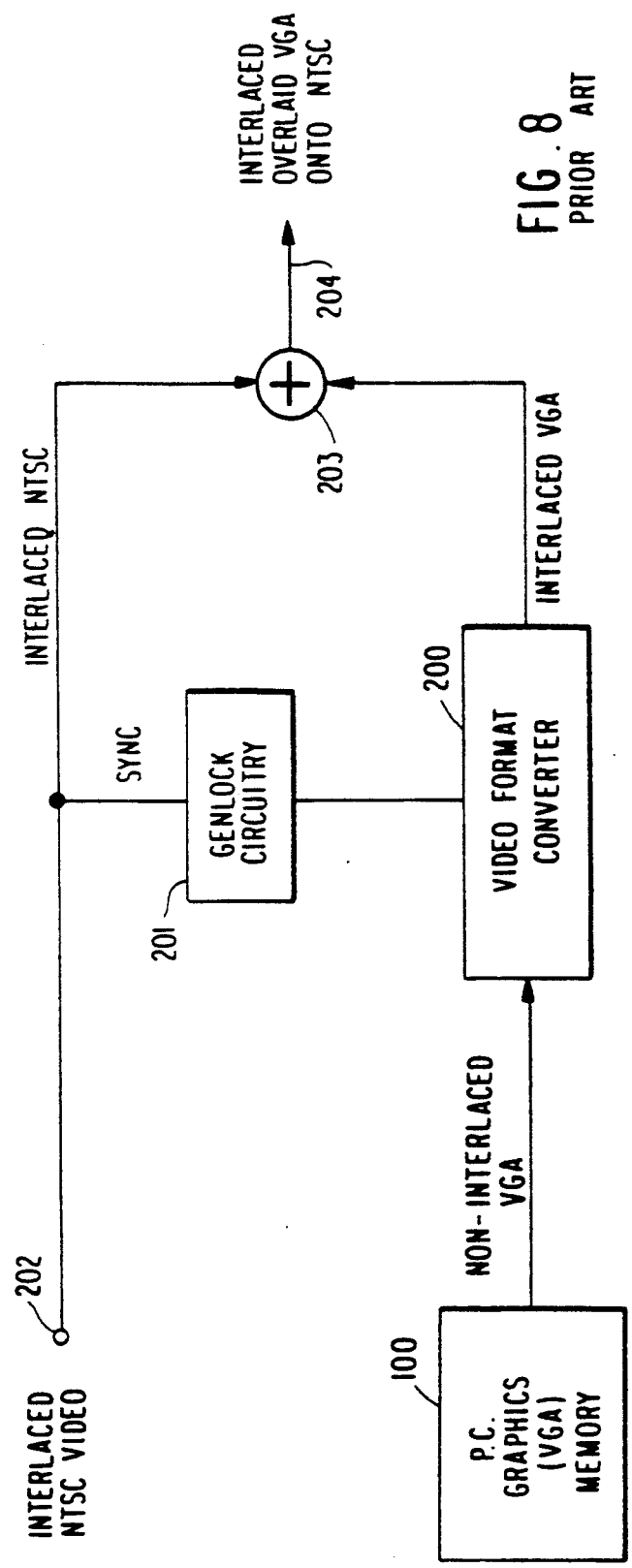
FIG. 8 shows a conventional system for overlaying VGA onto NTSC image signals.

The switcher gate-array 168 has the capability of recognizing whether each pixel is either of the true-color or the pseudo-color format, and controls video DACs 191, 198 and 178 in the appropriate manner. As a result, the hardware can switch between true-color and pseudo-color modes on a pixel-by-pixel basis. In the illustrative embodiment, pixels are represented by 16 bits, which include a bit #15 representing the true-color or pseudo-color mode, as shown in FIG. 5. If the bit #15 is a "1", the pixel is in the true-color mode while if bit #15 is a "0", the pixel is in the pseudo-color mode. This makes it possible to have a system which uses both representations simultaneously. Various sections of a video image are representable in the true-color format, while other sections are representable in the pseudo-color format. The remaining bits #14 through #0 are used in the conventional manner, i.e., to represent image data.

On receiving video data from the ADC 126, the timing gate-array 142 adds the bit #15 representative of the true-color mode to the input data before writing it to the VRAM 156. VGA video data generated by the personal computer 10 is once written to the VGA RAM 174 via a bus 192, as will be described. Then, the VGA controller 170 reads the data out of the VGA RAM 174 and transfers it to the VRAM 156 via the switcher gate-array 168, while adding the bit #15 representing the pseudo-color mode to the data.

A microcontroller 182 is connected to the timing gate-array 142 and has connection lines 184 and 186 connecting to the rec/player 12 and other similar video equipment. A bus Buffer 188 and a BIOS ROM 190 are connected to the timing gate-array 142, VGA controller 170, and switcher gate-array 168. The bus Buffer 188 interfaces the overlay and rescan board 14 to the personal computer bus 192. The BIOS ROM 190 stores and provides software to support the fundamental operations of the overlay and rescan board 14.

The frame memory which is identified as VRAM 156 can be connected to various video inputs and outputs. It is controlled by timing gate-array 142, which can be programmed to generate memory control signals and video synchronization signals for virtually any video standard. As a result, the single frame memory 156 can generate video for virtually any video standard. The programmable frame memory constituted by the VRAM 156 and timing gate-array 142 as stated earlier is used to generate the VGA type video signal and to generate the NTSC type video signal.

Now, a first function of the inventive overlay and rescan board will be described. This first function involves transforming VGA-type image signals to NTSC-type video signals. First, a brief description will be given of this function and immediately following will be a detailed description of the function.

VGA video data, for example, is fed from the personal computer 10 to the overlay and rescan board 14 via a bus 192. The VGA video data is once written to the VGA RAM 174 under the control of the VGA controller 170. To transform the VGA type video data into a real image type video signal, the switcher gate-array 168 causes signals from the VGA RAM 174 to be input to the VRAM 156 along lines 172, 166 and 164. As a result, the VGA video data stored in the VGA RAM 174 is read out under the control of the VGA controller 170 and then written to the VRAM 156. The timing gate-array 142 reads the video data out of the VRAM 156 in response to an NTSC, or other real image, standard timing signal generated by the Gen-lock circuit 150 while feeding the thus read-out video data to the NTSC switcher 138 or the RGB switch 130 along line 140.

By such a procedure, scan conversion from a VGA type video to an NTSC, for example, type video signal is executed. When the output of the board 14 is to be an NTSC signal, the NTSC switcher 138 connects the input 140 to the output 108 through digital-to-analog converter 198 with the result that NTSC type video signals are fed out via the output 108. When the output of the board 14 is to be an RGB signal or an S-type video signal, the RGB switch 130 selects the input 140 to cause RGB type video signals to appear on the output 112 through digital-to-analog converter 191. Concerning S-type video format, the S-video encoder 158 encodes the output of the RGB switch 130 into the S-type video format, and the S-type video signal appears on the output 110.

Now, as stated above, a detailed description of the first function, that is, transforming VGA-type signals to NTSC-type signals will be given. As shown in FIG. 2, video graphics data from the computer 10 is sent along line 192 through bus Buffers 188 and to the VGA controller 170 where it is sent along line 172 to VGA RAM 174. The VGA RAM 174 holds the data until the data is ready to be transformed from VGA type form into NTSC type form.

The VGA data is read out of the VGA RAM 174 along line 172 by the VGA controller 170. The data is next sent along line 166 to the switcher gate-array 168 whose details are shown, as described above, in FIG. 10. At this point, the computer 10 sends a control signal along line 192 to the control logic block 1007, shown in FIG. 10. The control logic block 1007 next sends a command signal along line 1006 to Buffer 1003, thus enabling the Buffer. Then, the video graphics data input to the switcher gate-array 168 along line 166 is sent through Buffer 1002 and further through Buffer 1003 up to Buffer 1001. Then, the data leaves the Buffer 1001 along line 164 and, thus, leaves the switcher gate-array 168 and makes its way to the VRAM 156.

VGA timing data, included in the VGA data, is sent along line 166 and along line 169 from the VGA controller 170 to the timer gate-array 142. Specifically, as shown in FIG. 9, the VGA timing data is applied to the programmable sync generator 711 where the sync signals are further sent to the VRAM address Buffer/Multiplexer 703 and the VRAM state machine 704 along lines 799 and 720, respectively. As described above, the VRAM state machine 704 controls the VRAM address Buffer/Multiplexer 703 so as to select from the plurality of inputs applied to the VRAM address Buffer/Multiplexer 703 one output to be used as address timing data during reading or writing to or from the VRAM 156. In this case, the VRAM state machine 704 receives the VGA sync information along line 720 and sends a control signal along line 719 to the VRAM address Buffer/Multiplexer 703, such a command signal telling the VRAM address Buffer/Multiplexer 703 to select input line 799 to be outputted along line 154 as write timing data for the VRAM 156.

In this way, the VGA data on line 164 from the switcher gate-array 168 is written into the VRAM 156 using write timing information which corresponds to VGA sync information supplied along line 154 from the timing gate-array 142.

Then, the Gen-lock logic block 713 detects, as described above, that no signal is being applied thereto on line 152. This is because there is no NTSC-type signal applied along line 124 to Gen-lock circuitry 150 in this operation.

As a result, the programmable sync generator 712 enters a free running mode, as described above, where the computer 10 sends synchronization signals along line 192 and line 717 to the programmable sync generator 712 so as to program the generator 712. As a result, the generator 712 outputs synchronization information, according to the synchronization information applied to the generator 712 along line 717. In the described example, VGA type data is to be transformed into NTSC type data so the computer 10 sends NTSC type synchronization information along line 717 to the programmable sync generator 712. The output of the programmable sync generator 712 on line 798 goes to the VRAM address Buffer/Multiplexer 703. An output of the programmable sync generator 712 splits off of line 798 to line 706 which goes to the VRAM state machine 704. By supplying the command signal along line 706 to the VRAM state machine 704, the VRAM state machine 704 outputs a command signal 719 to the VRAM address Buffer/Multiplexer 703, thus selecting the NTSC type synchronization information along line 798 to be output onto line 154 of the VRAM address Buffer/Multiplexer 703. In this way, read information with respect to the VRAM 156 is supplied to the VRAM 156 along line 154. The VGA data stored in the VRAM 156 is thus read out of the VRAM 156 along line 154 and is applied to the VRAM data Buffer 701 and further to the FIFO circuit 702 and on to the Buffer 714 along line 722. Once the data is in the Buffer 714, the data is applied to line 140 where it is sent, as shown in FIG. 2, to the NTSC switcher 138. The data is next output from the switcher 138 to the DAC 198 where it is converted into analog form and the resultant NTSC video data is available on output terminal 108.

Now, a second function of the inventive overlay and rescan board will be described, this second function involves transforming NTSC-type video data to VGA type image data. First, a brief description of this function will be presented and immediately following will be a detailed description of the function.

To convert real image type video signals into VGA type video signals, the switcher gate-array 168 connects the connection line 164 from the VRAM 156 to the output 176 which is connected to the video DAC 178. NTSC type video signals coming in through the input terminal 102 are decoded into RGB signals by the NTSC encoder 114 and then applied to the ADC 126 via the RGB switch 116. If the input signals are RGB signals, they are directly fed to the RGB switch 116 via the terminal 104. In the case of S-type video signals, they are routed through the input port 106 to the S-video encoder 118, encoded into RGB signals by the encoder 118, and then applied to the RGB switch 116. This analog RGB signal is converted by the ADC 126 into corresponding digital data, and the digital data is written to the VRAM 156 via the timing gate-array 142. In response to the VGA timing signal, the timing gate-array 142 reads the video data out of the VRAM 156 and delivers it to the video DAC 178 via the output port 164 and switcher gate-array 168. Such a procedure implements the scan conversion of real image type video, such as NTSC, into VGA type video.

The following detailed example will be given for the second function of the invention. This example describes the transformation of an NTSC type signal into a VGA type signal. An NTSC type signal is applied on line 102 as shown in FIG. 2 to an NTSC decoder 114 where the NTSC signal is transformed into a RGB signal and sent along line 120 to RGB switch 116. The signal is then output from the RGB switch 116 onto line 124 and is applied to both ADC 126 and a Gen-lock circuit 150. The Gen-lock circuit 150 takes the synchronization information from the NTSC signal and locks it, in a manner similar to a well known phase lock loop. The output of the Gen-lock circuit 150 is thus NTSC synchronization information which is sent along line 152 to the timing gate-array 142. The output of the ADC 126 is sent along line 146 and line 140 to the timing gate-array 142.

The output of the Gen-lock circuit 150, on line 152, is applied to the Gen-lock logic block 713, as shown in FIG. 9. The synchronization information is then output from the Gen-lock logic block 713 and applied to the programmable sync generator 712 where the synchronization information passes through the generator 712 on line 798 and onto the VRAM address Buffer/Multiplexer 703. Also, the output of the programmable sync generator 712 is applied to line 706, which branches off line 798, and line 706 is lead to the VRAM state machine 704. The VRAM state machine 704, which has the synchronization information applied to it on line 706 thus knows that the programmable sync generator 712 wishes to gain access to the VRAM 156. Thus, the VRAM state machine causes the VRAM address Buffer multiplexer to output on line 154 the synchronization information applied to the VRAM address Buffer/Multiplexer 703 along line 798 from the programmable sync generator 712. The output of the VRAM address Buffer/Multiplexer 703 is thus used as write timing data with respect to the VRAM 156.

Meanwhile, the output of the ADC 126, as described above, is sent along lines 146 and lines 140 to the timing gate-array 142. Specifically, as shown in FIG. 9, this data is applied to the Buffer 714 and sent along lines 722 to the FIFO circuit 702 and further to the VRAM data Buffer 701. Then, the data from the VRAM data Buffer 701 is written into the VRAM 156 along line 154 by using the write timing data generated by the VRAM address Buffer/Multiplexer 703 as described above.

Then, the computer 10 sends VGA type synchronization information by way of lines 166 and 169, as described above with respect to the first function, in order to provide VGA synchronization information to the VRAM address Buffer/Multiplexer 703 by way of the programmable sync generator 711. The programmable sync generator 711 supplies VGA synchronization data along lines 799 and 720 to the VRAM address Buffer/Multiplexer 703 and the VRAM state machine 704, respectively. Then, the VRAM state machine 704 sends a command signal along line 719 to the VRAM address Buffer/Multiplexer 703 so that the VRAM address Buffer/Multiplexer selects the synchronization information along lines 799 to be output onto line 154 to the VRAM 156 to be used as read timing data.

Thus, the data stored in the VRAM 156 is read out along line 164, as shown in FIG. 2, under a read timing dictated by the VGA synchronization format. The data read out of the VRAM 156 is sent to the switcher gate-array 168 as shown in FIG. 2. More specifically, as shown in FIG. 10, the data read out of the VRAM 156 is applied on line 164 to Buffer 1001 and on to the two-to-one multiplexer 1004 and on to the Buffer 1005 to the switcher gate-array 168 output line 176. At this point, the digital data is transformed to analog form by the DAC 178 and the thus-transformed data is supplied along line 180 in VGA form.

Figure 3:
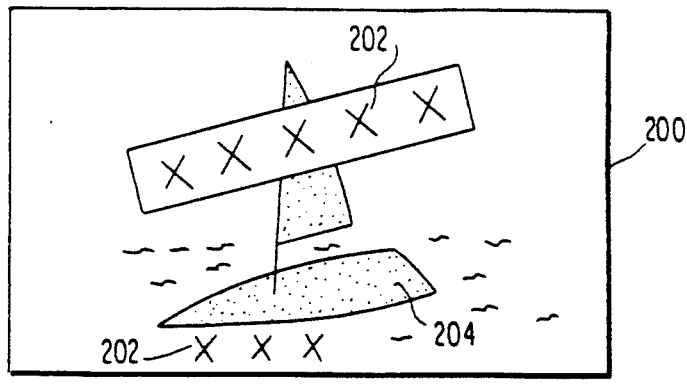
FIGS. 3 and 4 each shows a specific image which may be produced by the illustrative embodiment.

The imaging system in which the overlay and rescan board 14 interfaces the personal computer 10 to the rec/player 12 is successful in realizing various kinds of image processing based on the combination of a real image and a VGA image. For example, as shown in FIG. 3, text data 202 may be overlaid on a screen 200 showing a real image, with digitization and/or manipulation being applied to a particular portion 204 of the screen 200. The personal computer 10 generates the text data 202 and commands the digitization or the manipulation of the text data. Digitization and manipulation include posterization, paint, shrink, and move. The processing of a real image including the overlaying of text data 202 and digitization and manipulation is effected by a sequence of steps: feeding a video signal representing a real image and inputted via the input port 102, 104 or 106 to the input 136 of the NTSC switcher 138, transferring VGA video data from the VGA RAM 174 to the VRAM 156 and reading it out of the VRAM 156 using the timing gate-array 142 which employs scan conversion and, applying the scan-converted signal to the other input 140 of the NTSC switcher 138. Then, either one of the inputs 136 and 140 is selected on a pixel-by-pixel basis, as described below, to feed the resultant signal to the output 108 through digital-to-analog converter 198. The timing gate-array 142 identifies the pixel timings associated with the VGA data written in the VRAM 156 and causes the NTSC switcher 138 to perform switching at those pixel timings on a pixel-by-pixel basis. Such pixel-by-pixel switching of the NTSC switcher 138 occurs under the control of the timing gate-array 142 which is responsive to the control signal 152 generated by the Gen-lock unit 150. The Gen-lock unit 150 locks the phase to the video frequency of the input 102, 104 or 106, as stated previously. The scan conversion of the VGA video data stored in the VGA RAM 174 into the NTSC format is executed by the timing gate-array 142 and video DAC 198. The video signal representing the so processed real image 200 is fed out via the NTSC output 108 and applied to the video monitor 24 or similar equipment. The pixel-by-pixel switching described above allows a real image and a VGA image to be mixed without resorting to an image data storage having a large capacity.

This is also true with the case wherein the processed real image 200 is outputted in the form of RGB type and/or S-type video signals. In this instance, the RGB switch 130, instead of the NTSC switcher 138, performs switching on the pixel-by-pixel basis under the control of the timing gate-array 142, whereby the text data 202 and digitization and manipulation are combined with the real image 200.

In any case, the operator is capable of combining graphics and text with the real image 200 appearing on the video monitor 24 by manipulating the personal computer 10 while watching the image 200. Of course, the VGA image to be combined with the real image 200 may be of the kind giving a special effect such as scramble, wipe, scroll, offset, clip, wash, or rotate.

Now, a third function of the invention, such a function involving the overlaying of VGA video signals onto NTSC video signals will be described.

Firstly, the computer 10 sends VGA information along line 192 through the bus Buffers 188 as shown in FIG. 2 and on to the VGA controller 170 and further to the VGA RAM 174 along line 172. At the same time, VGA synchronization information is sent from the computer 10 along lines 166 and 169 to the timing gate-array 142. Using exactly the same operation as described above with respect to the first function, that is, transforming VGA to NTSC, the VGA data in the VGA RAM 174 is sent through the VGA controller 170 and the switcher gate-array 168 to the VRAM 156. The data is read into the VRAM 156 using read timing data produced based on the above-mentioned VGA synchronization information supplied from the VGA controller 170 through lines 166 and lines 169 to the timing gate-array 142. Again, the VGA synchronization information is used by the timing gate-array 142 to produce write timing data with respect to the VRAM 156 in the same way as it produced the write timing data for the first function described above. Thus, the VRAM 156 now contains the VGA data from the VGA RAM 174.

Meanwhile, NTSC type information is input on terminal 102 of FIG. 2 and is sent to the switch 134 and further to the ADC 199 where the information is converted to digital data and then is output along line 136 to the NTSC switcher 138.

The NTSC data is also sent to the NTSC decoder 114 which transforms the NTSC data into RGB data and outputs the RGB data onto line 120. The RGB data on line 120 is next sent to RGB switch 116 where it is output onto line 124 and applied to the Gen-lock circuit 150 where, as described above, synchronization information is phase locked and sent along line 152 to the timing gate-array 142. As shown in FIG. 9, the synchronization information along line 152 is applied to the Gen-lock logic 713 of the timing gate-array 142 and the synchronization information than passes through the programmable sync generator 712 on to line 798 and is applied to the VRAM address Buffer/Multiplexer 703 and the VRAM state machine 704 in a manner as described above so that the synchronization information is output onto line 154 to be used as read timing data for the VRAM 156.

Thus, data is read out of the VRAM 156 along line 154 and supplied to the VRAM data Buffer 701. This data is in the NTSC format since the NTSC synchronization information was locked by the Gen-lock circuit 150 and sent to the timing gate-array 142. The data is next sent to the FIFO circuit 702 and is applied along lines 722 to the Buffer 714 where it is output along line 140 to the NTSC switcher 138 as shown in FIG. 2.

At this point the NTSC switcher 138 receives two separate inputs. One input, as described above, is from the ADC 199 along line 136 and represents the NTSC information which was applied along input terminal 102. The second input, as also described above, is supplied along line 140 from the timing gate-array 142. Inside the timing gate-array 142 the overlay logic block 716 receives a keying color, which is, for example, transparent, into an overlay color register and also receives the data being sent along lines 722 from the FIFO circuit 702 to the Buffer 714. This information passes on line 796 which connects the Buffer 714 and the Buffer 715. The data from the Buffer 714 is transferred by means of line 796 to the Buffer 715 which is in turn transferred along line 723 to the actual data register, discussed above, of the overlay block 716. Next, as fully discussed above, and as is well known in the art, the overlay logic block 716 compares the contents of its two registers to determine whether or not the keying color is present in the data sent from the FIFO circuit 702 along line 722. When the keying color is present, the overlay logic block outputs on line 144, a control signal to the NTSC switcher 138 so as to cause the NTSC switcher to select the information output from the ADC 199 along line 136 to be supplied as an output of the NTSC switcher 138 and onto the DAC 198 to be finally supplied to output terminal 108.

If, in the overlay logic block 716, it is determined that the keying color has not been sent from the FIFO circuit 702 along line 722, then the command signal applied along line 144 is sent to the NTSC switcher 138 so as to select the signal on line 140, which represents the information stored in the Buffer 714 of FIG. 9 to be output of the NTSC switcher 138 and sent to the DAC 198 to the terminal 108.

Thus, by performing this type of pixel by pixel switching an overlayed image may be formed, such an overlayed image being in the NTSC format, that is, the interlaced format.

The DAC 198 also receives the control signal along line 144 from the overlay logic 716. The DAC 198, which is conventional in the art, switches to a different digital-to-analog converting scheme when the information supplied from the NTSC switcher 138 has been input on line 136 as opposed to the situation where the output of the NTSC switcher 138 is from line 140. As discussed above, the information originally input on line 102 and converted into digital form by the ADC 199 results in a different type of digital representation than the information sent from the computer 10 along line 192 to bus Buffers 188 and through the VGA controller 170 to the VGA RAM 174. The information sent by the computer uses a look-up table, as discussed fully above, while the information output of ADC 199 instead includes relative weights of the red, green and blue colors in its digital format. That is why the DAC 198 must be controlled, so that it can know which of the digital-to-analog conversion techniques it is to perform.

The end result on line 108 consists of an overlayed VGA type video signal onto an NTSC type video signal.

Figure 4:
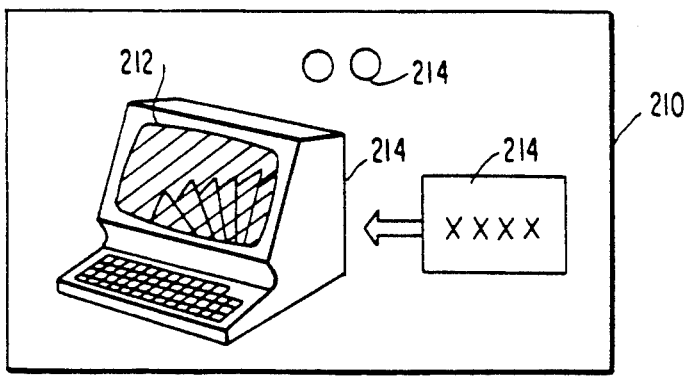

In another application, a real image may be inserted in graphics which are generated by the personal computer 10. FIG. 4 shows a specific case wherein a real image is inserted in a part 212 of a VGA image 210. In FIG. 4, the VGA image 210 includes various kinds of graphics 214 generated by the personal computer 10 and stored in the VGA RAM 174 as data of a raster image. On the screen 210, for the part 212 to accommodate the real image, a color "transparent" is designated. Alternatively, the color to be designated may be "black" or any other particular color.

Now, a fourth function of the inventive overlay and rescan board will be described, such a function being an overlay operation in which NTSC information is overlayed onto VGA information. First, a brief description of this operation will be presented, and immediately following, a detailed description of this function will be laid out.

More specifically, to overlay on the screen of the VGA monitor 16 the digitized video data stored in the VRAM 156 and the VGA graphics and text data stored in the VGA RAM 174, use is made of the mode indication bit #15 of the video data word. Generally, digitized video data and graphics and text data are represented in the true-color mode and the pseudo-color mode, respectively. The switcher gate-array 168 switches the two types of video data, while the video DAC 178 converts them into corresponding analog outputs. The true-color mode video data are converted into analog signals without a look up table being used, but the pseudo-color mode video data cannot be converted into color signals if a look-up table is not used. The switcher gate-array 168 references the mode bit #15 shown in FIG. 5 for each of the pixel data associated with the VGA video data and real image video data read out of the VGA RAM 174 and VRAM 156, respectively, and it instructs the video DAC 178 whether or not a look up table for conversion is needed. The switcher gate-array 168 identifies the pixel timings at which the color "transparent" of the VGA data has been designated and performs switching such that the real image data from the VRAM 156 are fetched at those timings on a pixel-by-pixel basis. The video data with the real image being inserted in the area of the VGA image 210 by the above procedure are converted into an analog VGA signal by the video DAC 178 and then fed out to the VGA monitor 16 via the output 180. The operator, therefore, can set the real image in the VGA image 210 appearing on the VGA monitor 16 by operating the personal computer 10 while watching the monitor 16. If desired, various special effects may be incorporated by the manipulation of the personal computer 10.

Now, a detailed description of the fourth function will be described. VGA information is sent from the personal computer 10 along the line 192 through the bus Buffers 188 through the VGA controller 170 along line 172 to the VGA RAM 174.

Meanwhile, NTSC information is input at terminal 102 and applied to the NTSC decoder 114 which transforms the NTSC information to RGB information and sends the RGB information along line 120 to the RGB switch 116 whose output on line 124 goes to the ADC 126 and the Gen-lock circuit 150. The Gen-lock circuit is a phase lock loop which locks the phase of the RGB signal and sends the locked phase to the timing gate-array 142. The output of the ADC 126 is sent to the timing gate-array 142 along lines 146 and 140.

The Gen-lock logic circuit 713 receives the locked phase of the NTSC signal sent along line 152 and sends this locked phase to the programmable sync generator 712 which supplies the synchronization information along line 798 to the VRAM address Buffer/Multiplexer 703 and along line 706 to the VRAM state machine 704. As described above, the VRAM state machine 704, as a result of receiving the synchronization information along line 706, sends a control signal along line 719 to the VRAM address Buffer/Multiplexer 703 so as to cause the VRAM address Buffer/Multiplexer 703 to output on line 154 the NTSC synchronization information provided along line 798. The synchronization information along line 154 is supplied to the VRAM 156 as write timing data.

The output of the ADC 126 in FIG. 2 is sent to the timing gate-array 142 and specifically enters the Buffers 714 where the data is sent along line 722 to the FIFO circuit 702 and onto the VRAM data Buffer 701 where the data is held until it is controlled by the write timing data output from the VRAM address Buffer/Multiplexer 703. The data is then written to the VRAM 156 under control of the write timing information along line 154.

Then, the VGA data is outputted from the VGA RAM 174 by means of the VGA controller along line 172 and the information is sent through the information controller 170 to the switcher gate-array 168 along line 166.

Specifically, as shown in FIG. 10, the information from the VGA controller 170 enters the switcher gate-array 168 along line 166 and is applied to the Buffer 1002 where it is supplied to the two-to-one multiplexer 1004. The VGA data output from the VGA controller 170 is also applied along lines 166 and 169 to the timing gate-array 142. Specifically, the synchronization information along line 169 is applied to the programmable sync generator 711 and sent along line 799 to the VRAM address Buffer/Multiplexer 703 and along line 720 to the VRAM state machine 704. The VRAM state machine 704 sends a control signal along line 719 to the VRAM address Buffer/Multiplexer 703 which selects the VGA synchronization information from line 799 as the signal to be applied to the output of the VRAM address Buffer/Multiplexer 154 as read control data. Information is thus read out of the VRAM 156 using the read control data along line 154 using the VGA synchronization information and the read out data is sent along line 164 as shown in FIG. 2 and applied to the Buffer 1001 as shown in FIG. 10 of the switcher gate-array 168. The information stored in the Buffer 1001 of FIG. 10 is next sent to the two-to-one multiplexer 1004.

Looking back at FIG. 9, the overlay logic block 716 receives the VGA data that is sent along lines 166 and 169, as described above to the timing gate-array 142 and, specifically, the data is sent to Buffer 715 and through line 723 is applied to the overlay logic block 716. In this way, the VGA information may be monitored by the overlay logic block 716 in order to detect when the VGA data contains the keying color described above. This color can be, for example, transparent. When the overlay logic block 716 detects that the keying color is included in the VGA data sent to the logic block 716 through Buffer 715 and line 723, a control signal is sent along line 144 to a control input of the two-to-one multiplexer 1004 as shown in FIG. 10. The control signal along line 144 thus selects the signal from Buffer 1001 to be sent as an output of the multiplexer 1004 and which is further sent to the Buffer 1005 and applied as an output 176 of the switcher gate-array 168.

When the keying color has not been detected by the overlay logic block 716 of FIG. 9, a control signal is sent along line 144 to the control input of the two-to-one multiplexer 1004 so as to select the signal stored in the Buffer 1002 to be applied as an output of the multiplexer 1004 and sent to the Buffer 1005 to an output 176 of the switcher gate-array 168. Thus, pixel-by-pixel switching may be performed with respect to the data in Buffer 1001, which was originally input into terminal 102 and the data stored in Buffer 1002 which was originally input by means of the computer 10 of FIG. 1.

The output of the switcher gate-array 176 is sent to DAC 178 where the information is converted into analog form to be supplied as an overlayed NTSC onto VGA signal at terminal 180. The DAC 178 performs two types of digital-to-analog conversion and the control signal 144 is also sent as a control input to the DAC 178 to tell the DAC which type of digital-to-analog conversion to follow, in an analogous manner as the DAC 198, as described above.

Thus, as fully described above with respect to the four functions of operation of the inventive overlay and rescan board 14, a variety of video processing functions using a variety of types of video signals can be accomplished using the minimum amount of hardware.

Figure 11:
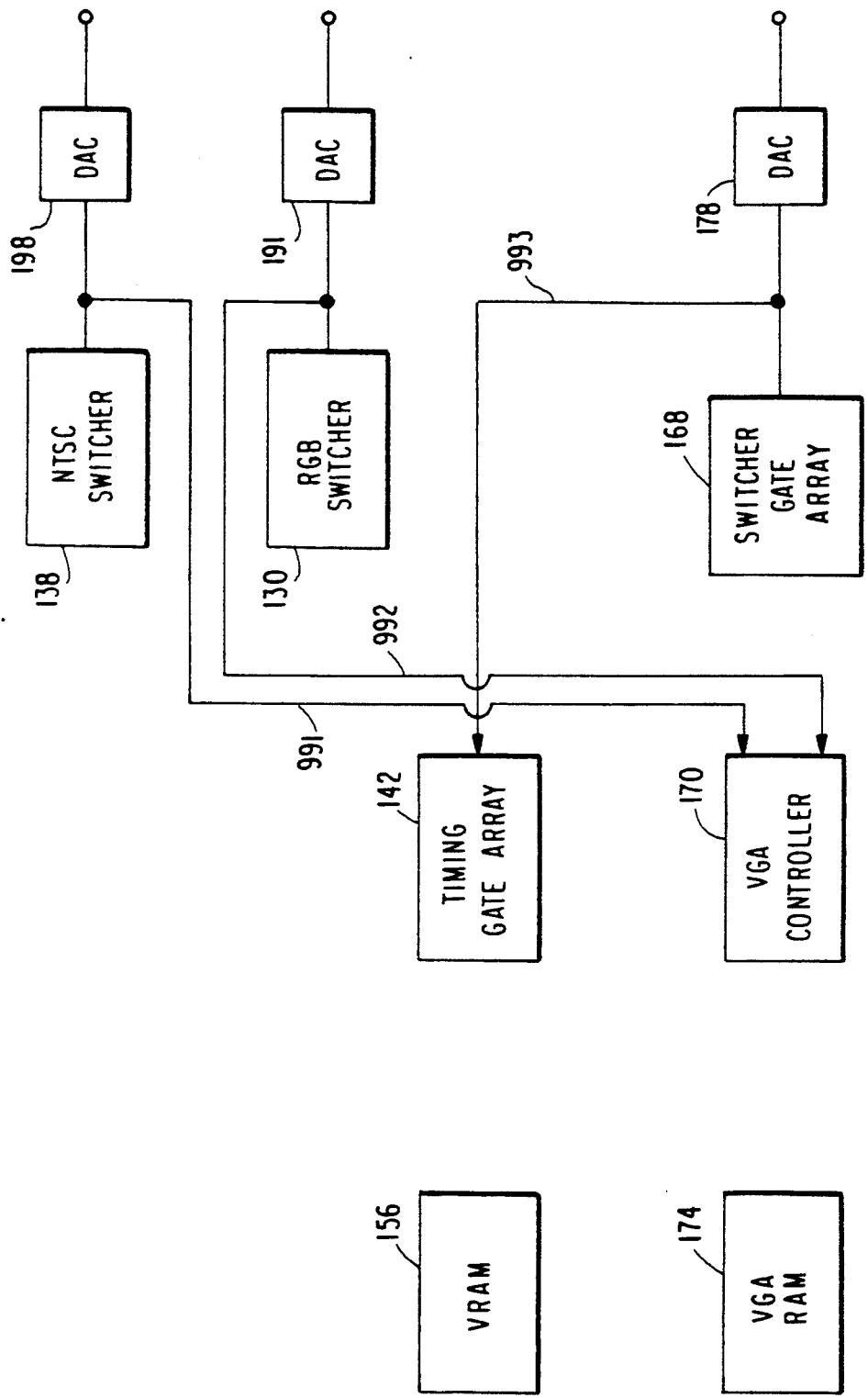
FIG. 11 shows another embodiment of the invention enabling storage of overlaid signals into an external memory device.

Another embodiment of the invention will now be described in which storage of a composite overlaid signal is made possible. As described above, the rate at which the overlaid signals are output on terminals 108, 110, 112 or 180 is too high to enable an external memory device to receive the overlaid signals. Therefore, a modification to the overlay and rescan board of FIG. 2 has been designed by the inventors and is shown in FIG. 11. For the sake of simplicity, only the circuit elements of FIG. 2 needed to show the modification are shown in FIG. 11. Also, for the sake of simplicity, only the electrical connections which have been added to FIG. 2 in order to create the modification are shown in FIG. 11.

As is clear from FIG. 11, feedback connections have been added to the circuit of FIG. 2 in order to send overlaid signals back to the frame memories. More specifically, feedback line 991 is connected from the output of NTSC switcher 138 back to the input of VGA controller 170, so that an overlaid VGA onto NTSC signal may be stored into VGA RAM 174 under the control of VGA controller 170. Likewise, feedback line 992 is connected from the output of RGB switch 130 back to the input of VGA controller 170, so that an overlaid VGA onto RGB or S-type video signal may be stored into VGA RAM 174 under the control of VGA controller 170.

Feedback line 993 is provided from the output of switcher gate array 168 back to the input of timing gate array 142 so that overlaid NTSC, RGB, or S-type video signals onto VGA image signals may be stored into VRAM 156 under the control of timing gate array 142.

The above-described feedback paths are merely exemplary. Any of the switcher 138, 130 or 168 outputs may be fed back to any of the controller 142 or 170 inputs to temporarily store the overlaid images. Further, not only overlaid images but also output signals representing images that have been converted from one image format, i.e., VGA, to another, i.e., NTSC, may be fed back and stored in memories 156 or 174.

In order to enable output signals to be fed back to either the timing gate array 142 or the VGA controller 170 the personal computer 10 sends commands through bus buffers 188 to these circuit elements to stop receiving new image data through ADC 126 and from the computer 10 respectively. Then, the circuit elements 142 and 170 are switched to a write mode where they cause overlaid images from the outputs of circuit elements 138, 130 or 168 to be written into memories 156 or 174.

With respect to the feeding back by means of line 993 of signals from the switcher gate array 168 output 176, the signal passes on line 993 to the Buffer 715 of the timing gate array 142 as shown in FIG. 9. Programmable sync generator 711 receives VGA timing data from a Gen-lock circuit (not shown) so as to send the timing data along line 799 and line 720 to the VRAM Address Buffer/Multiplexer 703 and the VRAM state machine 704, respectively. The VRAM Buffer/Multiplexer 703 is thus instructed by the VRAM state machine 704 to choose its input line 799 to be output onto its output line 154 where it is supplied to VRAM 156 as write timing data.

Meanwhile, the VGA format data which was sent along line 993 of FIG. 11 to Buffer 715 of FIG. 9 is sent, by means of lines 796 and 722 to the FIFO circuit 702 and the VRAM Data Buffer 701. From there the data is written into VRAM 156 under the control of the write timing data supplied from the VRAM Address Buffer/Multiplexer 703, as described above.

By feeding the overlaid images back into the VRAM 156 or the VGA RAM 174 and storing them in the VRAM 156 or the VGA RAM 174, the thus-stored overlaid images may be then transferred from the internal memories 156 or 174 to an external memory at a transfer rate which the external memory can handle. Thus, the overlaid images stored in external memory devices may be easily and selectably read out and displayed on a monitor at a later time without having to re-overlay the image signals making up the composite overlaid signal. Also, further processing or overlaying of the overlaid signals is greatly simplified.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. An image data processing apparatus comprising:
   randomly accessible first storing means consisting of a single memory unit for rewritably storing image data representative of one image frame;
   first inputting means connected to a bus of a digital data processing system for inputting a first type of image data to said first storing means, said first type of image data being computer graphics data formatted to be non-interlaced and compatible with said data processing system;

first control means for controlling write-in and read-out of image data with respect to said first storing means;

second inputting means for inputting a second type of image data representative of a real image in a raster scanning, interlaced fashion to said first control means;

first outputting means connected to said first control means for outputting image data of said first type;

second outputting means connected to said first control means for outputting image data of said second type;

first feedback means for feeding the first type of image data output from said first outputting means to said first storing means; and second feedback means for feeding the second type of image data output from said second outputting means to said first storing means; wherein said first control means includes selective storing means for selectively storing either of image data input to said apparatus by said first or said second inputting means and image data appearing at said first or said second outputting means selectively through said first or second inputting means or said first or second feedback means into said first storing means based on commands from said processing system; and said first control means also includes selective reading means for selectively reading out image data stored in said first storing means as either of image data of said first and said second type based on commands from said processing system, and feeding said first and said second type of image data to said first and said second outputting means, respectively.

2. An apparatus according to claim 1, wherein image data is stored in said first storing means in digital form.

3. An apparatus according to claim 2, wherein:
image data stored in said first storing means includes a first indication indicating whether the stored image data was input to said apparatus by said first or said second inputting means; and said first outputting means comprising first signal converting means for converting, upon receiving image data of said first type, the received image data of said first type into an analog image signal of one of two formats depending upon said first indication.

4. An apparatus in accordance with claim 3, wherein said first inputting means comprises:
second storing means connected to the bus of the processing system for storing said first type of image data received over said bus; and second control means for reading said first type of image data out of said second storing means to write said first type of image data to said first storing means.

5. An apparatus in accordance with claim 4, wherein said first image data input to said apparatus through said first inputting means has a data format including a second indication indicative of an address of a look-up table which designates a color for forming pixels.

6. An apparatus according to claim 5, wherein said first outputting means further comprises first switch means for outputting image signals, which were input to said apparatus through said second inputting means and which are stored in said first storing means, when said second indication of image signals stored in said second storing means designates a predetermined color and for outputting image signals stored in said second storing means otherwise.

7. An apparatus according to claim 6, wherein said predetermined color is transparent.

8. An apparatus according to claim 6, wherein said second outputting means comprises:
second signal converting means for converting, upon receiving image data of said second type, the received image data of said second type into an analog signal of one of two formats depending upon said first indication; and second switching means for receiving image signals which were input through said second inputting means and which were sent directly to said second switching means as a primary second switching means input signal and image signals which were input to said apparatus through said first inputting means and which were stored in said first storing means as a secondary second switching means input signal, and for outputting said primary second switching means input signal when said second indication of said secondary second switching means input signal designates a predetermined color and for outputting said secondary second switching means input signal otherwise; said first control means reading, in synchronism with said primary second switching means input signal, said secondary second switching means input signal out of said first storing means to feed said secondary second switching means input signal to said second outputting means and causing said second switching means to switch on a pixel-by-pixel basis, whereby said primary second switching means input signal is combined with said secondary second switching means input signal.

9. An apparatus as claimed in claim 1 in which image data input to said apparatus through said second inputting means comprises a television signal.

10. An apparatus in accordance with claim 4 wherein:
said second control means includes selective output signal storing means for selectively storing image data appearing at either said first or said second outputting means into said second storing means based on commands from said processing system.

11. The apparatus of claim 1 wherein said first outputting means has a sole dedicated function of outputting image data to a monitor of said first type and said second outputting means has a sole dedicated function of outputting image data to a monitor of said second type.

12. An image data processing apparatus comprising:
randomly accessible first storing means consisting of a single memory unit for rewritably storing digital data representative of one frame of an image;

general-purpose, digital data processing means for generating a first type of image data, said first type of image data being computer graphics data formatted to be non-interlaced;

second storing means connected to a bus of said general-purpose processing means for storing the first type of image data generated by said general-purpose processing means;

control means for controlling write-in and read-out of image data associated with said first and said second storing means;

inputting means for inputting a second type of image data representative of a real image in a raster scanning, interlaced fashion to said control means and to first switch means;

first switch means comprising a first input for receiving said second type of image signal directly from said inputting means and a second input for receiving image data from said control means, and responsive to said control means for selectively connecting either one of said first and second inputs to an output; and first outputting means connected to the output of to said first switch means for visualizing an image of the second type of image data;

wherein:

said control means includes first reading means for reading said first type of image data generated by said general-purpose processing means out of said second storing means to store said first type of image data in said first storing means, second reading means for reading the image data out of said first storing means in synchronism with said second type of image data input through said inputting means to feed the image data to said second input of said first switch means, and switch control means for causing said switch means to switch on a pixel-by-pixel basis, whereby the image data received on said second input is combined with the image data on said first input; and said control means is provided also with feedback means for feeding the second type of image data appearing at the output of said switch means and said control means is provided with writing means for storing the second type of image data into said first storing means.

13. A system in accordance with claim 12, wherein said first storing means stores data having a first indication for indicating whether the image data is of the first type generated by said general-purpose processing means or of the second type input to said system through said inputting means.

14. A system in accordance with claim 13, wherein the first type of image data generated by said general-purpose processing means has a data format including a second indication indicating an address of a look-up table which designates a color for forming pixels.

15. A system in accordance with claim 14, further including a second switch means having a first input connected to said first storing means and a second input connected to said second storing means.

16. A system in accordance with claim 15, in which said control means also includes image data storing means for storing said second type of image data input to said system through said inputting means into said first storing means, and image data reading means for reading out the stored image data in synchronism with said first type of image data generated by said general-purpose processing means, and for providing the thus read-out image data to the first input of said second switching means.

17. A system in accordance with claim 16, in which said second switching means includes pixel-by-pixel switch means for switching, on a pixel-by-pixel basis, to the image signal on said first input of said second switching means when said second indication of said image signal on said second input of said second switching means designates a predetermined color, and for otherwise switching to the image signal on said second input of said second switching means.

18. A system in accordance with claim 17 in which said predetermined color is transparent.

19. A system in accordance with claim 12 in which the image data of said second type input to said system through said inputting means is a television signal.

20. A system in accordance with claim 15 wherein an output signal of said second switch means is fed back to said control means so that said control means can write the second switch means output signal into said second storing means.

21. The apparatus of claim 12 wherein said first outputting means has a sole dedicated function of outputting image data to a monitor for visualizing said image of the second type of image data.

* * * * *